US008103507B2

(12) United States Patent
Sagen et al.

(10) Patent No.: US 8,103,507 B2
(45) Date of Patent: Jan. 24, 2012

(54) SEARCHABLE MULTIMEDIA STREAM

(75) Inventors: Hallgrim Sagen, Oslo (NO); Geir Arne Sandbakken, Oslo (NO); Nicolai Grodum, Oslo (NO); Norma Lovhaugen, Oslo (NO); Espen Christensen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 1456 days.

(21) Appl. No.: 11/564,589

(22) Filed: Nov. 29, 2006

(65) Prior Publication Data
US 2007/0156843 A1 Jul. 5, 2007

(30) Foreign Application Priority Data
Dec. 30, 2005 (NO) .................................. 20056255

(51) Int. Cl.
*G10L 15/18* (2006.01)
(52) U.S. Cl. ........................ 704/270; 704/257
(58) Field of Classification Search .......... 704/230–257, 704/270
See application file for complete search history.

(56) References Cited

U.S. PATENT DOCUMENTS

| 6,243,676 | B1 | 6/2001 | Witteman |
| 6,535,848 | B1 * | 3/2003 | Ortega et al. ............... 704/235 |
| 7,707,227 | B2 * | 4/2010 | Shibata ....................... 707/802 |
| 7,912,699 | B1 * | 3/2011 | Saraclar et al. .................. 704/9 |
| 2002/0176404 | A1 | 11/2002 | Girard |
| 2003/0174202 | A1 | 9/2003 | Eshkoli et al. |
| 2004/0083101 | A1 | 4/2004 | Brown et al. |
| 2004/0172247 | A1 | 9/2004 | Yoon et al. |
| 2005/0078172 | A1 | 4/2005 | Harville et al. |
| 2008/0255837 | A1 * | 10/2008 | Kahn et al. .................. 704/235 |

FOREIGN PATENT DOCUMENTS

| GB | 2 351 628 A | 1/2001 |
| WO | WO 03/063484 A1 | 7/2003 |

* cited by examiner

*Primary Examiner* — Abul Azad
(74) *Attorney, Agent, or Firm* — Oblon, Spivak, McClelland, Maier & Neustadt, L.L.P.

(57) ABSTRACT

The present invention provides a system and a method making an archived conference or presentation searchable after being stored in the archive server. According to the invention, one or more media streams coded according to H.323 or SIP are transmitted to a conversion engine for converting multimedia content into a standard streaming format, which may be a cluster of files, each representing a certain medium (audio, video, data) and/or a structure file that synchronizes and associates the different media together. When the conversion is carried out, the structure file is copied and forwarded to a post-processing server. The post-processing server includes i.a. a speech recognition engine generating a text file of alphanumeric characters representing all recognized words in the audio file. The text file is then entered into the cluster of files associating each identified word to a timing tag in the structure file. After this post-processing, finding key words and associated points of time in the media stream could easily be executed by a conventional search engine.

13 Claims, 4 Drawing Sheets

SEARCHABLE MULTIMEDIA STREAM

FIELD OF THE INVENTION

The present invention relates to videoconferencing and streaming/archiving systems.

BACKGROUND OF THE INVENTION

To have a meeting among participants not located in the same area, a number of technological systems are available. These systems may include videoconferencing, web conferencing or audio conferencing.

The most realistic substitute of real meetings is high-end videoconferencing systems. Conventional videoconferencing systems comprise a number of end-points communicating real-time video, audio and/or data streams over WAN, LAN and/or circuit switched networks. The end-points include one or more monitor(s), camera(s), microphone(s) and/or data capture device(s) and a codec, which encodes and decodes outgoing and incoming streams, respectively. In addition, a centralized source, known as a Multipoint Control Unit (MCU), is needed to link the multiple end-points together. The MCU performs this linking by receiving the multimedia signals (audio, video and/or data) from end-point terminals over point-to-point connections, processing the received signals, and retransmitting the processed signals to selected end-point terminals in the conference.

By using a videoconferencing system, a PowerPoint presentation or any other PC-presentation may for instance be presented while still being able to see and hear all the other participants.

Another common way of presenting multimedia content is to stream data to computers through a web interface. The data stream may be transmitted in real-time, or a play back of an archived content through a distribution device. Conventional streaming data is adapted for storage and distribution, and therefore the multimedia content is represented in a different format than for video conferencing. Hence, to allow for streaming and archiving of a conventional video conference, a system for converting the multimedia data is needed. One example of such system is described in the following.

A distribution device is preferably provided with a network interface for connecting the device to a computer network, audio/video and presentation data interfaces for receiving conference content, a file conversion engine for converting presentation content into a standard image format for distribution, and a stream encoder for encoding the content into streaming format for distribution. The distribution device is further equipped with a stream server for transmitting the encoded audio/video content and a web server for transmitting web pages and converted presentation content to terminals located at nodes of the network. The distribution device is also adapted to create an archive file consisting of the encoded stream data, residing at local storage media or in a server/database, to enable later on-demand distribution to requesters at remote terminals over the computer network.

According to a typical mode of operation, the conference is initiated by including the distribution device as a participant in the conference. A viewer at a remote terminal can access a conference by directing a conventional web browser to an URL (Uniform Resource Locator) associated with the distribution device. After completion of validation data interchanges between the viewer and the distribution device, the viewer is able to view the personal interchange, i.e. the conversation and associated behaviour, occurring between the participants at the conference presenter site, as well as view the presentation content being presented at the conference site. The multimedia content is viewed in a multiple-window user interface through the viewer web browser, with the audio/video content presented by a streaming media player, and the presentation content displayed in a separate window. When requested by the head of the conference or by the conference management system, encoded stream data is stored in a server as an identifiable file.

The combination of streaming and conferencing technology opens up new possibilities for storing and documenting meetings, presentations, lectures and other forms of conversation and deliveries. However, this will be of limited value if not being able to search in the content of archived stream data. The only known way to enable search in archived stream data is to manually associate metadata to the stored files. However, this requires a lot of manual work, and it does not guarantee that the metadata correspond correctly to the stream data.

SUMMARY OF THE INVENTION

It is an object of the present invention to provide a system and a method solving the above-mention problems in prior art.

The features defined in the independent claims enclosed characterise this arrangement and method.

In particular, the present invention provides a method in a streaming and archiving system for post-processing a multimedia stream converted from a conventional conference format coded data stream for the purpose of making the multimedia stream searchable, comprising the steps of monitoring in a H.323/SIP compatible conversion engine whether a H.323 or SIP coded data stream is received, and if so, converting the conventional conference format coded data stream to a multimedia stream in a defined multimedia streaming format including timing information related to respective fragments of the multimedia stream, analyzing fragments of sound from an audio part of said multimedia stream in a speech recognition engine by generating a model of each respective fragment of sound or sequences of fragments of sound, and comparing the respective model of each respective fragment of sound or sequences of fragments of sound with reference models of pronunciations of known words or phonemes stored in a database, and finally assigning a timing information referring to a fragment or a sequence of fragments whose model said speech recognition engine has found to match a reference model of a pronunciation of a known word in said database, and associatively storing the said timing information and said word in a text file.

BRIEF DESCRIPTION OF THE DRAWINGS

In order to make the invention more readily understandable, the discussion that follows will refer to the accompanying drawings.

DETAILED DESCRIPTION THE INVENTION

In the following, the present invention will be discussed by describing a preferred embodiment, and by referring to the accompanying drawings. However, people skilled in the art will realize other applications and modifications within the scope of the invention as defined in the enclosed independent claims.

Even if video conferencing is visual, most of the explicit information in a videoconference is represented in the verbal communication between the participants. The audio part of the conference would therefore be the most adequate medium in which to search.

The present invention provides a system and a method making an archived conference or presentation searchable after being stored in the archive server. According to the invention, one or more media streams coded according to H.323 or SIP are transmitted to a conversion engine for converting multimedia content into a standard streaming format, which may be a cluster of files, each representing a certain medium (audio, video, data) and/or a structure file that synchronizes and associates the different media together. When the conversion is carried out, the structure file is copied and forwarded to a post-processing server. The post-processing server includes i.a. a speech recognition engine generating a text file of alphanumeric characters representing all recognized words in the audio file. The text file is then entered into the cluster of files associating each identified word to a timing tag in the structure file. After this post-processing, finding key words and associated points of time in the media stream could easily be executed by a conventional search engine.

Figure 2:
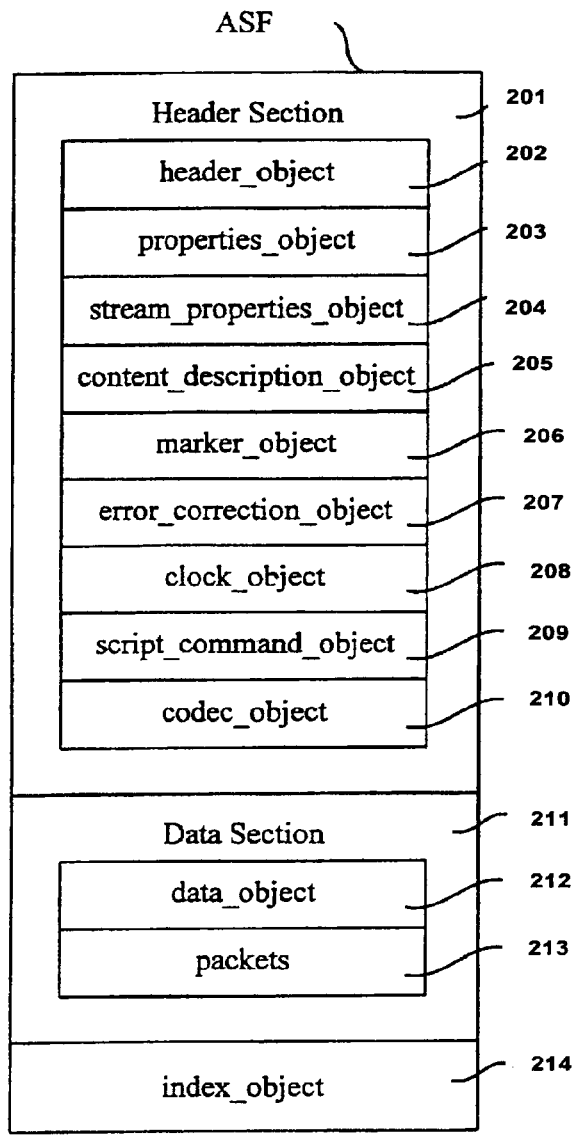
FIG. 2 shows the data structure of the ASF streaming format.

An example of a structure file mentioned above is disclosed in U.S. Pat. No. 6,041,345, which defines an Active Stream Format (ASF) for storage and transmission of multiple media streams. An overview of the ASF format is shown in FIG. 2.

To implement the present invention a robust and effective speech recognition method for use in the speech recognition engine is required. A speech recognition, in its simplest definition, is the automated process of recognizing spoken words, i.e. speech, and then converting that speech to text that is used by a word processor or some other application, or passed to the command interpreter of the operating system. This recognition process consists of parsing digitized audio data into meaningful segments. The segments are then mapped against a database of known phonemes and the phonetic sequences are mapped against a known vocabulary or dictionary of words.

In speech recognition, hidden Markov models (HMMs) are often used. When an HMM speech recognition system is built, each word in the recognizable vocabulary is defined as a sequence of sounds, or a fragment of speech, that resemble the pronunciation of the word. A Markov model for each fragment of speech is created. The Markov models for each of the sounds are then concatenated together to form a sequence of Markov models that depict an acoustical definition of the word in the vocabulary.

Figure 1:
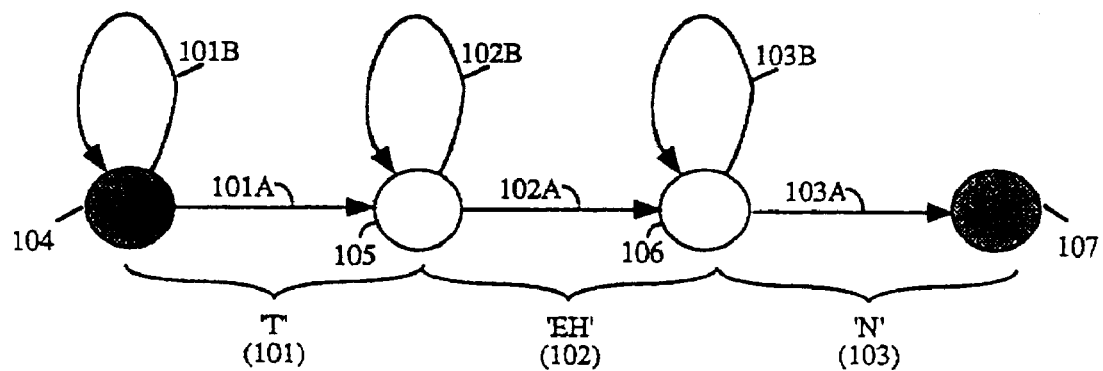
FIG. 1 illustrates a state diagram for Markov modelling.

For example, as shown in FIG. 1, a phonetic word 100 for the word "TEN" is shown as a sequence of three phonetic Markov models, 101-103. One of the phonetic Markov models represents the phonetic element "T" (101), having two transition arcs 101A and 101B. A second of the phonetic Markov models represents the phonetic element "EH", shown as model 102 having transition arcs 102A and 102B. The third of the phonetic Markov models 103 represents the phonetic element "N" having transition arcs 103A and 103B.

Each of the three Markov models shown in FIG. 1 has a beginning state and an ending state. The "T" model 101 begins in state 104 and ends in state 105. The "EH" model 102 begins in the state 105 and ends in state 106. The "N" model 103 begins in state 106 and ends in state 107. Although not shown, each of the models actually has states between their respective beginning and ending states in the same manner as arc 101A is shown coupling states 104 and 105. Multiple arcs extend and connect the states. During recognition, an utterance is compared with the sequence of phonetic Markov models, starting from the leftmost state, such as state 104, and progressing according to the arrows through the intermediate states to the rightmost state, such as state 107, where the model 100 terminates in a manner well-known in the art. The transition time from the leftmost state 104 to the rightmost state 107 reflects the duration of the word. Therefore, to transition from the leftmost state 104 to the rightmost state 107, time must be spent in the "T" state, the "EH" state and the "N" state to result in a conclusion that the utterance is the word "TEN". Thus, a hidden Markov model for a word is comprised of a sequence of models corresponding to the different sounds made during the pronunciation of the word.

In order to build a Markov model, such as described in FIG. 1, a pronunciation dictionary is often used to indicate the component sounds. Various dictionaries exist and may be used. The source of information in these dictionaries is usually a phonetician. The components sounds attributed to a word as depicted in the dictionary are based on the expertise and senses of the phonetician.

There are other ways of implementing speech recognition, e.g. by using neural networks alone or in combination with Markov models, that may be used with the present invention.

According to the present invention, each recognized word is consecutively associated with a timing tag referring to a certain location in the audio file. As an example, the above-mentioned ASF format shown in FIG. 2 stores media samples in the data section 211. Associated to this data section, there are several indications of time and synchronization data. The ASF stream includes e.g. a marker_object 206 that holds a pointer to a specific time within the data section 211. The marker_object enables a user to quickly jump forward or backward to specific data points (e.g., audio tracks) that are designated by markers held within the marker_object 206.

Figure 3A:
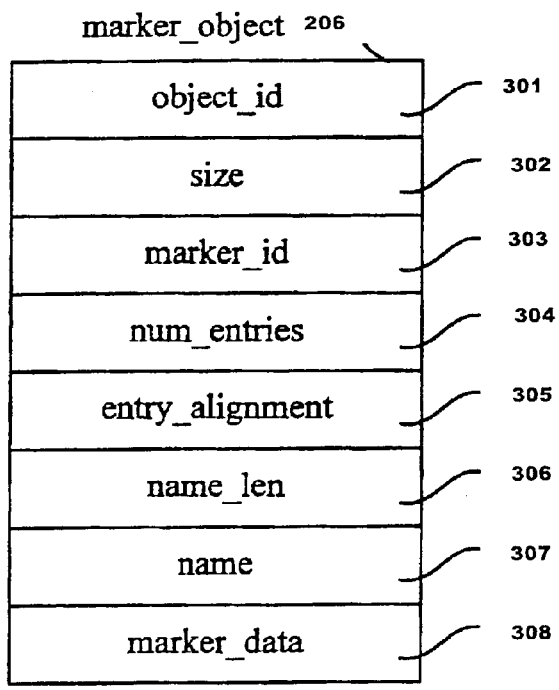
FIG. 3 is a closer view on two specific parts of the data structure of the ASF streaming format.

FIG. 3A shows the marker_object 206 in more detail. The marker_object 206 includes an object_id field 301 that holds a Universal Unique Identifier (UUID), and a size field 302 specifies the size of the marker_object in bytes. A marker_id field 303 contains a UUID that identifies the marker data strategy, and a num_entries field 304 specifies the number of marker entries in the marker_object 206. An entry_alignment field 305 identifies the byte alignment of the marker data, and a name_len field 306 specifies how many Unicode characters are held in the name field 307, which holds the name of the marker_object 206. Lastly, the marker_data field 308 holds the markers in a table. Each marker has an associated entry in the table.

Figure 3B:
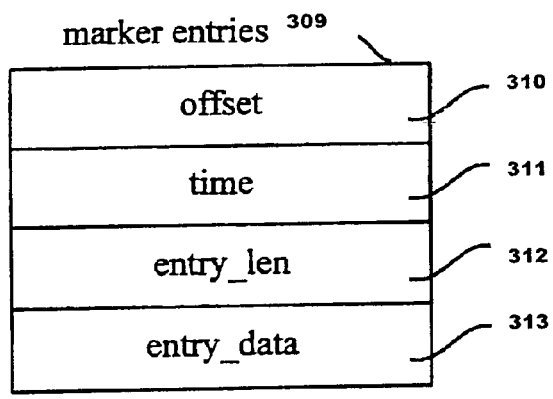

FIG. 3B shows the format of a marker_entry 309 such as found in the marker_data field 308. An offset_field 310 holds an offset in bytes from the start of packets in the data_object 212 indicating the position of the marker entry 309. A time_field 311 specifies a time stamp for the marker entry 309. An entry_len field 312 specifies the size of an entry_data field 313, which is an array holding the data for the marker entry.

In one embodiment of the invention, the time_field 311 and/or the offset_field 310 associated with the start of a fragment of sound to be analyzed by the Markov model is stored in a temporal storage. If a word is recognized by the speech recognition engine in the fragment of sound, the time_field 311 and/or the offset_field 310 is defined as the timing tag of the recognized word and are stored associatively together with the word in the text file of recognized words. Alternatively, the timing tag could also include some of the other fields in the ASF structure representing timing information of the data. In another embodiment of the invention, timing information representing the end of the sound fragment of a recognized word is associated with the word, then limiting the need of a temporal storage.

Figure 4:
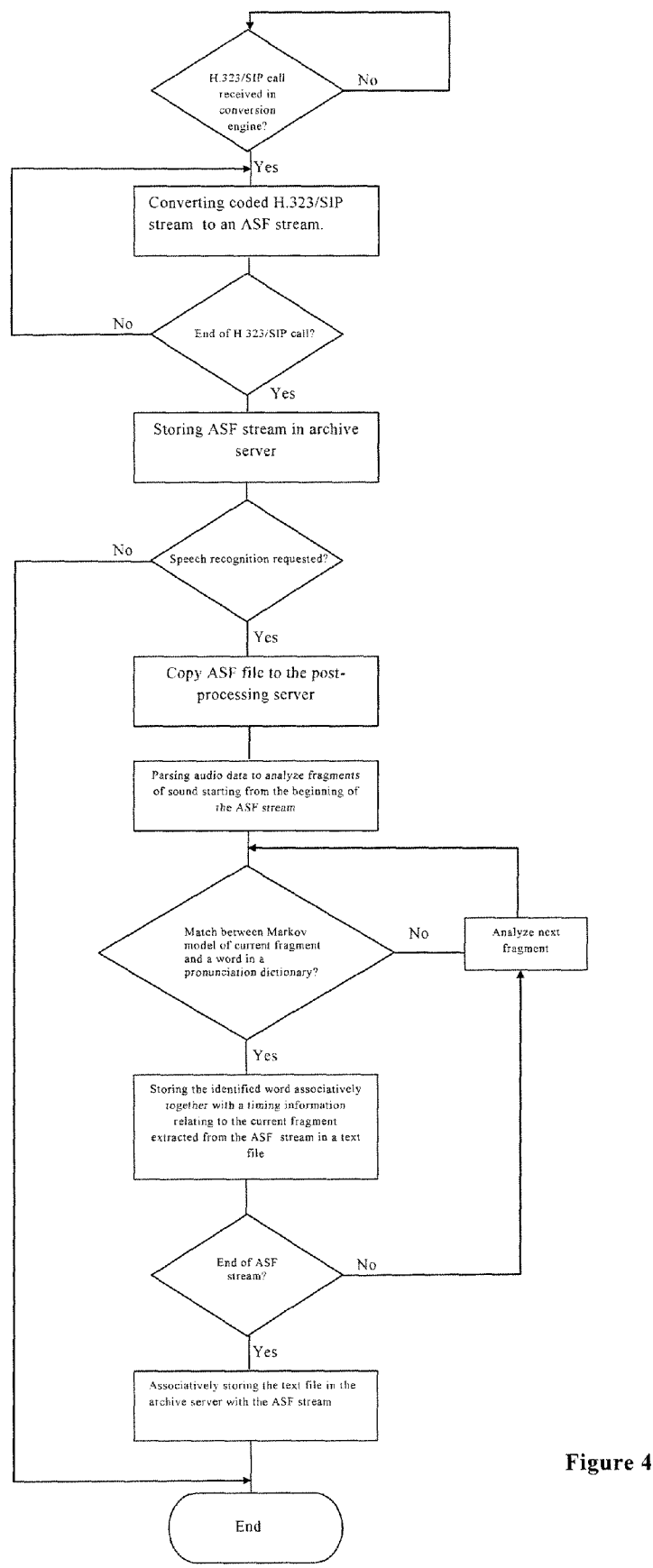
FIG. 4 shows a flow chart illustrating the overall steps of one embodiment of the present invention.

In the following an example embodiment of the present invention will be described based on the flow chart of FIG. 4. The conversion engine, which is capable to receive a H.323/SIP call just as a conventional H.323/SIP endpoint, monitors whether a H.323/SIP call is received. When so, it starts converting the receiving coded H.323/SIP data to the above-mentioned ASF format by a conventional transcoding technique known in the art. When the call has ended, or when a request for terminating the recording is received, the ASF stream is stored in an archive server. In practice, the stream will be stored consecutively as the multimedia data is converted.

Then, if speech recognition has been requested, the ASF stream is copied to a post-processing server. The post-processing server starts parsing the data to analyze fragments of sound according to the above-mentioned Markov model. When a match between a Markov model of a sound fragment and the Markov model of a specific word or character in a pronunciation dictionary is found, the specific word or character is stored in a text file together with a timing tag. The timing tag is captured from e.g. the marker_object 206 representing the time location of the data associated to the sound fragment in the ASF stream, from which the word or character was recognized. The multimedia synchronization features of the ASF format imply that a timing tag for audio content also represents a timing tag for a corresponding time location in the video content of the ASF stream.

When all the audio content is parsed for recognizable words, the text file will include a number of words and characters associated with respective timing tags. This file is stored in the archive server with an association to the corresponding ASF stored stream.

When a text file of recognized words in a converted multimedia conference or call with associated timing tags is stored, the call/conference would then be searchable by key words, and the hits would be connected to a certain time in the multimedia stream.

One example of use could be to provide a user with a search engine not unlike conventional search engines for searching in plain text. The user could be given the choice of searching in one or a number of stored and converted calls/conferences. The result of the search could show up as a list of hits with information like conference identification, time in conference etc. Additionally, the user will have the possibility of playing back the media stream from the time in the conference where the key word was found by e.g. a play button behind the hit. When the user pushes the play button, a media player being able to play back the media stream is started, and the timing tag associated with the hit is used to indicate from where in the media stream the media player should start playing. For the sake of convenience, the media player should start playing a bit before the time of the actual hit. Therefore, a predefined offset may be subtracted from the timing tag.

As an example, in a converted conference, the word "agreement" is recognized by the speech recognition method by a match between the Markov models of a spoken word in the audio content, and the Markov models of "agreement" in a pronunciation dictionary. Subsequent to the conference, a user is interested to investigate whether the participants entered into an agreement during the conference. The user selects the conference of interest in his multimedia search engine, and strikes the word "agreement". As a result, two hits shows up relatively closely located in time. The user pushes the play button of the first hit, and may witness the part of the conference wherein an agreement was discussed, and he could be quiet sure that the discussion was limited to the identified part of the conference only.

Note that even if only ASF format for multimedia streaming is mentioned here, the present invention could also be used in connection with other current and future corresponding multimedia formats for various players like QuickTime, RealPlayer, etc.

In an alternative embodiment of the invention, the recognized phonemes are stored, grouped, but no attempt is made to convert them to words in any particular language. Indexing is then made based on a selection of these groups, e.g. using taxonomy or a set of dictionaries from several languages, or by frequency or emphasis. Then the volume, or the stress or intonation of the phoneme may be registered as well, and used for selection of groups to be indexed.

In another alternative embodiment a participant or secretary will mark words or phoneme groups that shall form the basis of an index, or input a set of criterias e.g. using speech.

In another alternative embodiment, the indexing is based on a corporate taxonomy, that could be available in several languages.

The invention claimed is:

1. A method in a streaming and archiving system for post-processing a multimedia stream converted from a conventional conference format coded data stream for the purpose of making the multimedia stream searchable, comprising:
   monitoring in a H.323/SIP compatible conversion engine whether a H.323 or SIP coded data stream is received; and
   when the H.323 or SIP coded data stream is received,
      converting the conventional conference format coded data stream to a multimedia stream in a defined multimedia streaming format including timing information related to respective fragments of the multimedia stream,
      analyzing fragments of sound from an audio part of said multimedia stream in a speech recognition engine by
         generating a model of each respective fragment of sound or sequences of fragments of sound, and
         comparing the respective model of each respective fragment of sound or sequences of fragments of sound with reference models of pronunciations of known words or phonemes stored in a database, and
      assigning a timing information referring to a fragment or a sequence of fragments whose model said speech recognition engine has found to match a reference model of a pronunciation of a known word in said database, and associatively storing said timing information and said word in a text file.

2. An method according to claim 1, wherein the step of analyzing further includes:
   extracting and temporarily storing information indicating a time position within said multimedia stream of the current fragment of sound, and
   when a match between a model of a current fragment of sound or a sequence of fragments of sound with said current sound included and a reference model of a pronunciations of a known word or phoneme in said database is found, then using said time position as said timing information which associatively is being stored together with said word or an input word or tag in said text file.

3. A method according to claim 1 or 2, further comprising:
storing, in the streaming and archiving system, said text file when all fragments of sound from said audio part of said multimedia stream are analyzed such that said text file is accessible for later search in said multimedia stream.

4. A method according to claim 1, wherein
said models and reference models include Markov models.

5. A method according to claim 1, wherein
said defined multimedia streaming format is an Active Stream Format (ASF).

6. An method according to claim 5, wherein
said timing information is a time field and/or an offset field of the ASF associated with the start or the end of matched fragment or sequence of fragments.

7. A method according to claim 1,
characterized in that conventional conference format coded data stream is a H.323, H.320 or SIP coded data stream.

8. A method according to claim 1, wherein
the timing information identifies a specific location of the audio part of said multimedia stream.

9. A method according to claim 1, wherein
the text file includes timing information for each word included in the text file having a fragment or sequence of fragments whose model said speech recognition engine has found to match a reference model of a pronunciation of a known word in said database.

10. A method according to claim 1, further comprising:
associatively storing the text file in the streaming and archiving system with the multimedia stream in the defined multimedia streaming format.

11. A method according to claim 1, further comprising:
storing the multimedia stream in the defined multimedia streaming format, the multimedia stream including audio and video data.

12. A method according to claim 1, further comprising:
acquiring the audio part from the multimedia stream, the multimedia stream including the audio part and at least one other part corresponding to a different media type, wherein
the timing information associated with the word in the text file identifies a playback location of the audio part and the at least one other part corresponding to the different media type.

13. A system for post-processing a multimedia stream converted from a conventional conference format coded data stream for the purpose of making the multimedia stream searchable, comprising:
a converting engine configured to receive a H.323 or SIP coded data stream and to convert the conventional conference format coded data stream to a multimedia stream in a defined multimedia streaming format including timing information related to respective fragments of the multimedia stream,
a post-processing server configured to receive said multimedia stream or a copy of said multimedia stream,
a speech recognition engine included in or connected to said post-processing server configured to analyze fragments of sound from an audio part of said multimedia stream and compare a model of each respective fragment of sound or sequences of fragments of sound with models of pronunciations of known words or phonemes stored in a database,
a time assigning means configured to associate a timing information referring to a fragment or a sequence of fragments whose model said speech recognition engine has found to match a reference model of a pronunciation of a known word in said database, and associatively storing said timing information and said word in a text file.

* * * * *